United States Patent
Chang et al.

(10) Patent No.: US 6,225,574 B1
(45) Date of Patent: May 1, 2001

(54) LOAD WEIGHING SYSTEM FOR A HEAVY MACHINERY

(75) Inventors: Shu-Chieh Chang, Greenfield; Michael J. Rikkola, Milwaukee; Paul G. Phillips, Wauwatosa; John S. Burant, Waukesha; Demeng Chen, Milwaukee, all of WI (US)

(73) Assignee: Harnischfeger Technology, Inc., Wilmington, DE (US)

( * ) Notice: Subject to any disclaimer, the term of this patent is extended or adjusted under 35 U.S.C. 154(b) by 0 days.

(21) Appl. No.: 09/187,146

(22) Filed: Nov. 6, 1998

(51) Int. Cl.[7] ............................ G01G 19/08; G01G 19/10; G06F 19/00
(52) U.S. Cl. ..................... 177/139; 177/141; 701/50
(58) Field of Search ........................ 701/50; 177/136, 177/141, 147, 139

(56) References Cited

U.S. PATENT DOCUMENTS

| | | | |
|---|---|---|---|
| 4,677,579 | 6/1987 | Radomilovich | 177/147 |
| 4,691,792 | * 9/1987 | Shintani | 177/141 |
| 4,809,794 | 3/1989 | Blair et al. | 177/139 |
| 4,919,222 | * 4/1990 | Kyrtsos et al. | 177/139 |
| 5,070,953 | * 12/1991 | Kyrtsos et al. | 177/25.14 |
| 5,105,896 | * 4/1992 | Kyrtsos | 177/139 |
| 5,717,167 | * 2/1998 | Filing et al. | 177/136 |

* cited by examiner

*Primary Examiner*—Randy W. Gibson
(74) *Attorney, Agent, or Firm*—James Earl Lowe, Jr.

(57) ABSTRACT

A hoisting machine including a device supported from a structure, the device holding the material to be lifted, the structure being movable to locate the device in respective loaded and unloading positions, and apparatus for measuring the quantity of material delivered by the device, the apparatus comprising means to determine the position of the device with respect to a selected location in the structure at a plurality of intervals during the movement of the device, means to provide a processable position signal indicative of the determined position of the device, means to determine the load at a selected location within the structure where the load is related to the weight of the device and device contents at the intervals during the movement of the device, means to produce a processable load signal indicative of the determined load at the location, and processing means to receive the position and load signals for a plurality of interval determinations and calculate therefrom a number of weight determinations of the device and device contents from the interval determinations made during the movement, to select a sample of less than all of the weight determinations based upon the dynamic influences on the machine when the signals are processed, and to average the sample of selected weight determinations to provide a final weight determination of the device and device contents.

8 Claims, 6 Drawing Sheets

LOAD WEIGHING SYSTEM FOR A HEAVY MACHINERY

BACKGROUND OF THE INVENTION

The field of the invention is heavy equipment used for collecting and moving a load from one place to another, and for measuring the weight of the load while it is being moved.

More particularly, the field of the invention is heavy equipment for surface mining loading operations such as power shovels, drag lines, and the like, and more particularly, systems used on such equipment to measure the net weight of material in each load.

In large scale surface mining operations, equipment of immense proportions is used to load and transport material. Loading is usually performed by power shovels with a dipper capacity of about 100 tons per scoop. Equally mammoth trucks are loaded with the material and haul it to a processing location. The largest trucks have a capacity of about 360 tons.

Overloading the trucks can lead to premature fatigue and failure causing excessive maintenance costs. Without a measurement of the actual weight of material in the truck, the power shovel operator can only guess the weight based on an extremely rough estimate of the volume of material in the truck. Therefore, to prevent chronic overloading, the trucks are routinely underloaded. But such underloading can cause significant loss of production.

Measurement systems have been developed to indicate the net weight of material in the power shovel dipper as it is transferred to the truck. The prior measurement systems function by first sensing the electrical load of the power shovel drive motors, then computing the motor dynamics based on that electrical load, and finally computing an estimate of the net weight based on the motor dynamics, the known power shovel geometry, and the known tare weights. Examples of such known systems include Radomilovich U.S. Pat. No. 4,677,599 and Blair et al. U.S. Pat. No. 4,809,794, which averages stored weight determinations calculate an actual material weight.

Although such measurement systems have been constructed and used, they have been ineffective due to large inaccuracies in the measurements on the order of ±20% or more. These errors stem from the fact that the existing measurement systems do not effectively account for the complex dynamic operation of such enormous equipment, or for all the environmental effects on the equipment, such as the level of the mine surface where the shovel is located. Therefore, measurements are not only in error, but are erratic and unpredictable. In order to be effective, a measurement system has to be capable of accurately and repeatedly performing measurements to within a small error, say ±2% for example. Otherwise, the problems of overloading and underloading would persist. Although the above noted measurement systems have attempted to account for dynamic factors affecting the load weighing process, such systems have been either too complex or incomplete.

SUMMARY OF THE INVENTION

The invention provides a method of measuring the quantity of material delivered per cycle by large mining and hoisting machinery, such as a shovel loader and a crane, the machinery having a device to hold the material to be delivered, the device being movable between loaded and unloading positions, the device being supported from a structure during movement between the positions, the method comprising determining the position of the device in respect to a selected location on the structure in the form of a processable position signal at a plurality of intervals during the movement of the device between the loaded and unloading positions, determining the load at a selected location within the structure where the load is related to the weight and position of the device and device contents in the form of a processable load signal at each the interval, processing the position and load signals for a plurality of interval determinations to provide a number of weight determinations of the device and device contents from the interval determinations made during the movement, selecting a sample of less than all of the weight determinations based upon the dynamic influences on the machinery when the signals are processed, and averaging the selected sample of weight determinations to provide a final determination of the weight of the device and device contents.

The invention further provides a hoisting machine including a device supported from a structure, the device holding the material to be lifted, the structure being movable to locate the device in respective loaded and unloading positions, and apparatus for measuring the quantity of material delivered by the device, the apparatus comprising means to determine the position of the device with respect to a selected location in the structure at a plurality of intervals during the movement of the device, means to provide a processable position signal indicative of the determined position of the device, means to determine the load at a selected location within the structure where the load is related to the weight of the device and device contents at the intervals during the movement of the device, means to produce a processable load signal indicative of the determined load at the location, and processing means to receive the position and load signals for a plurality of interval determinations and calculate therefrom a number of weight determinations of the device and device contents from the interval determinations made during the movement, to select a sample of less than all of the weight determinations based upon the dynamic influences on the machine when the signals are processed, and to average the sample of selected weight determinations to provide a final weight determination of the device and device contents.

In one embodiment, the structure includes a platform, and an upwardly extending boom connected at the lower end to the platform, and the device is suspended from the boom.

The invention also provides means to determine the position of the device with respect to a selected location in the structure at a plurality of intervals during the movement of the device including means for determining the angle of the boom relative to the direction of the force of gravity. In one embodiment, the boom angle determining means is an inclinometer mounted on the boom.

In one embodiment, the structure further includes a sheave at the top of the boom, and a hoist rope trained over the sheave and attached to the device to suspend the device from the boom, and wherein the means to determine the position of the device with respect to a selected location in the structure at a plurality of intervals during the movement of the device considers the sheave diameter and the angle the hoist rope leaves the sheave.

It is an advantage of the present invention to provide an improved system for measuring the load weight of large mining and lifting machinery, which system eliminates the need to try to compute dynamic force effects on the machine in order to get an accurate weight measurement.

It is still another advantage of this invention to provide a measuring system of the foregoing type which can determine such calculations in a dynamic state and with an accuracy of within ±2%.

It is yet another advantage of the present invention to provide a measuring system of the foregoing type which takes into account that the lifting machinery may be located on uneven ground.

It is yet another advantage of the present invention to provide a measuring system of the foregoing type which is adaptable for use with a wide variety of mining and lifting machinery.

BRIEF DESCRIPTIONS OF THE DRAWINGS

Figure 1:
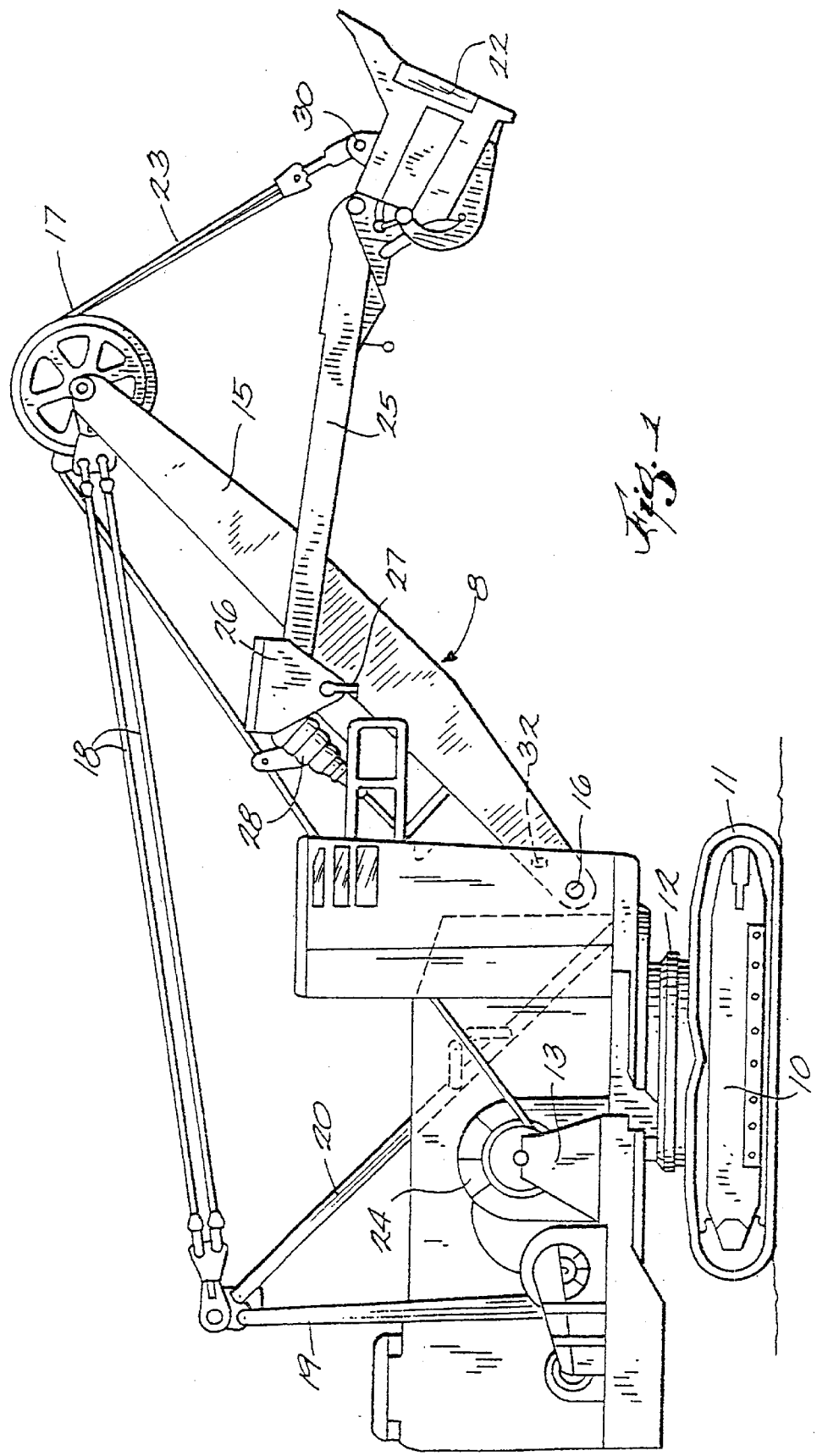
FIG. 1 is a plan view of a surface mining shovel which employs the load measurement system of the present invention.
Figure 2:
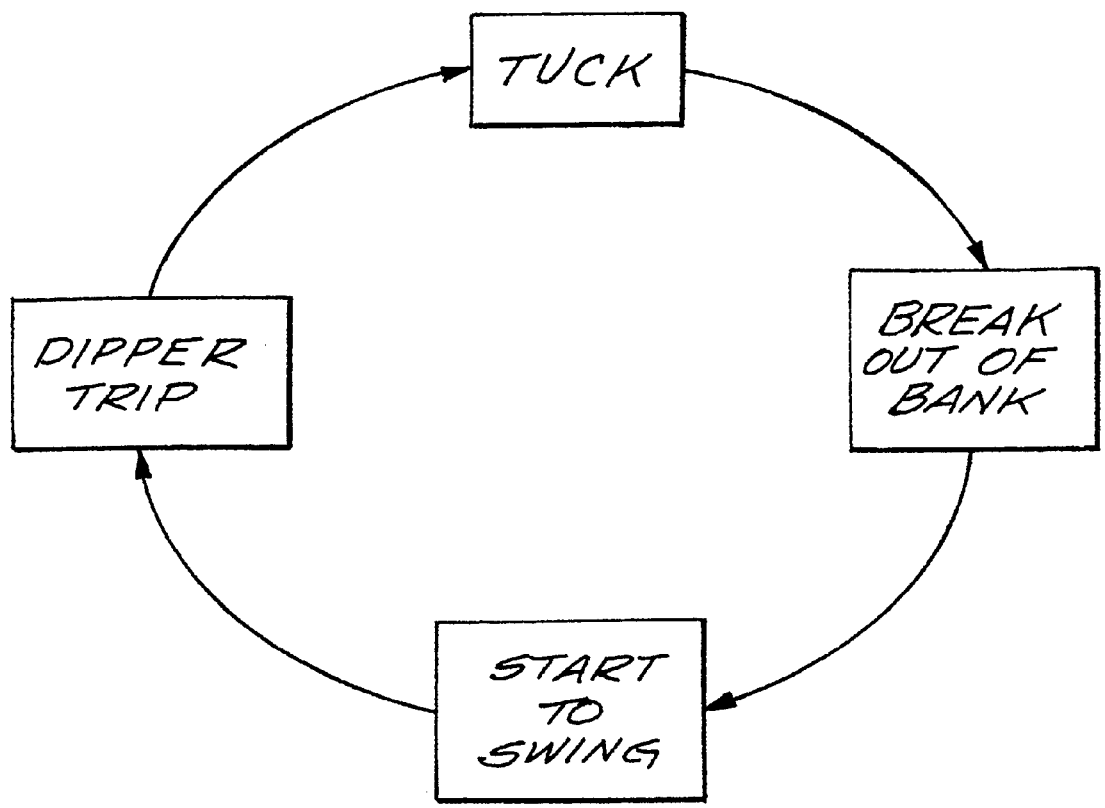
FIG. 2 is a mode transition block diagram of the load measurement system of FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

DESCRIPTION OF THE PREFERRED EMBODIMENT

The invention is a hoisting machine 8 including a device 22 supported from a structure. More particularly, the machine can be a piece of large mining machine or an industrial crane. In this detailed description, a power shovel is described, and the device 22 for holding the material to be lifted is a dipper. In other embodiments (not shown), the device can be a bucket, a hook or some other container.

The structure further includes a platform in the form of a machinery deck 13, and an upwardly extending boom 15 connected at the lower end 16 to the platform 13, and a sheave 17 at the top of the boom 15. The dipper 22 is suspended from the boom 15 by a hoist rope 23 trained over the sheave 17 and attached to the dipper 22 at a bail pin 30. The machine structure is movable to locate the dipper 22 in respective loaded and unloading positions. More particularly, the structure is mounted on a turntable 12.

Referring to FIG. 1 the power shovel depicted therein of the well known construction commonly referred to as a rope shovel. This shovel loader comprises a mobile base 10 supported on drive tracks 11, and having supported thereon through the turntable 12, the machinery deck 13. The turntable 12 permits full 360° rotation of the machinery deck relative to the base.

The boom 15 is pivotally connected at 16 to the machinery deck 13. The boom 15 is held in a upwardly and outwardly extending relation to the deck by a brace in the form of tension cables 18 which are anchored to a back stay 19 of a stay structure 20 rigidly mounted on the machinery deck 13.

The dipper 22 is suspended by the hoist rope or cable 23 from the sheave 17, the hoist rope being anchored to a winch drum 24 mounted on the machinery deck 13. As the winch drum rotates, the hoist rope 23 is either paid out or pulled in, lowering or raising the dipper 22. The dipper has an arm 25 rigidly attached thereto, with the dipper arm 25 slidably supported in a saddle block 26, which is pivotally mounted on the boom 15 at 27. The dipper arm has a rack tooth formation thereon (not shown) which engages a drive pinion (not shown) mounted in the saddle block 26. The drive pinion is driven by an electric motor and transmission unit 28 to effect extension or retraction of the dipper arm 25 relative to the saddle block 26.

A source of electrical power (not shown) is mounted on the machinery deck 13 to provide power to one or more hoist electric motors (not shown) which drives the winch drum 24, a crowd electric motor (not shown) which drives the saddle block transmission unit 28, and a swing electric motor (not shown) which turns the machinery deck turntable 12. The above described basic construction of the shovel loader is widely known and used and further details of the construction are not provided as they are well known in the art.

Each of the crowd, hoist, and swing motors is driven by its own motor controller (not shown) which responds to operator commands to generate the required voltages and currents in well known fashion.

Figure 9:
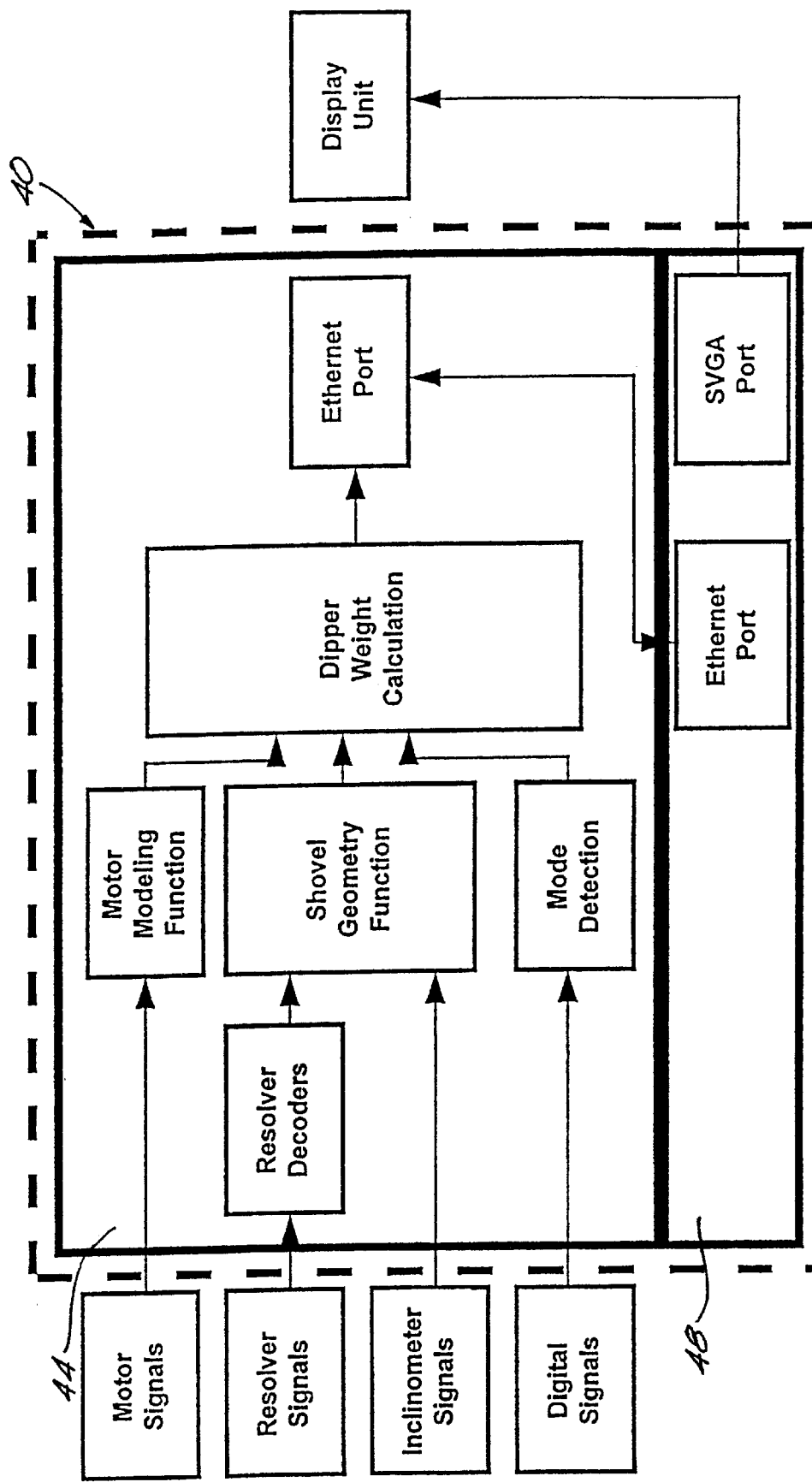
FIG. 9 is a schematic illustration of the basic hardware used in the load weighing system of the invention.

The hoisting machine 8 further includes apparatus in the form of a load measurement system 40 (see FIG. 9) for measuring the quantity of material delivered by the dipper 22. More particularly, the load measurement system comprises means to determine the position of the dipper with respect to a selected location in the structure at a plurality of intervals during the movement of the dipper, means to provide a processable position signal indicative of the determined position of the dipper, means to determine the load at a selected location within the structure where the load is related to the weight of the dipper and dipper contents at the intervals during the movement of the dipper, and means to produce a processable load signal indicative of the determined load at the location.

The load measurement system of this invention is described in conjunction with a mining shovel. It should be apparent to one skilled in the art that the load measurement system of this invention could be adapted to other loading equipment, for example a dragline. In this case the determinations made in conjunction with the crowd motor would be made instead for the dragline motor. Similarly, the load measurement system can be advantageously employed in connection with a crane wherein the indicated hoist motor determinations would instead be made in conjunction with the motor which raises and lowers the boom.

More particularly, the means to determine the position of the dipper with respect to a selected location in the structure at a plurality of intervals during the movement of the dipper, and the means to provide a processable position signal indicative of the determined position of the dipper, in the preferred embodiment, are in the form of hoist, crowd, and swing resolvers or encoders 34 (see FIG. 3), respectively, as more fully described below.

Determination that the dipper is swinging is obtained by detecting rotation of the motor driving the turntable 12 or of a component in the turntable drive transmission. This is conveniently achieved by the swing resolver incorporating a member coupled to the turntable drive. The extent of angular movement of the machinery deck, and the angular velocity and acceleration thereof can be calculated from the signals received from the resolver.

A similar resolver, the hoist resolver, is also incorporated in the drive of the winch drum 24 so that the length of cable played out from the winch drum is calculated from the rotation of the drum. The hoist resolver signal is used to calculate an effective hoist rope length. The effective hoist rope length is the rope distance between the dipper bail pin 30 and the top of the sheave 17, this being one coordinate in determining the position of the dipper, as described below. The hoist resolver also provides velocity and acceleration data, as more fully described below.

A further resolver, the crowd resolver, is incorporated in the drive of the pinion that extends or retracts the dipper arm 25 relative to the saddle 26. The crowd resolver signal is used to calculate the distance between the bail pin 30 and the axis 27 of the pivot connection between the saddle block 26 and the boom 15, as more fully described below. The crowd resolver also provides velocity and acceleration data.

The position determining means to determine the position of the dipper with respect to a selected location in the structure also includes means for determining the angle of the boom relative to the direction of the force of gravity. In the preferred embodiment, the boom angle determining means is an inclinometer 32 mounted on the shovel platform 13. The inclinometer 32 provides important boom positioning information, especially where the rope shovel is situated on an incline. Prior art systems which do not take this into account produce inaccurate force direction information, with inaccurate results.

Normally, the torsion cable or cables 18 which connect the upper portion of the boom 15 to the stay structure are arranged so as to be under tension under all operating conditions. In some constructions the inclination of the boom can be adjustable, and these tension cables or members can be extended or retracted as required. When the boom primarily retains a fixed position relative to the platform during the normal operation of the shovel loader, the inclinometer 32 mounted on the platform 13 provides means for determining the angle of the boom relative to the direction of the force of gravity. But when the construction of the shovel loader is such that the boom position may be varied during operation, the inclinometer 32 can be mounted on the boom 15. In either instance, the inclinometer 32 produces a signal which indicates the angular disposition of the boom 15 relative to true vertical (the direction of the force of gravity).

The inclinometer monitors the forward and backward position of the shovel boom. In other embodiments, the left and right position of the shovel relative to true vertical can also be monitored with a second inclinometer (not shown), if the rope shovel is likely to be used in situations where the shovel is situated on the side of a hill.

More particularly, the means to determine the load at a selected location within the structure where the load is related to the weight of the dipper and dipper contents at the intervals during the movement of the dipper, and the means to produce a processable load signal indicative of the determined load at the location takes the form of crowd motor and hoist motor current sensors, as more particularly described below.

Suitable load sensing means are provided to generate a signal having a known relation to the total weight supported by the boom. The sensing means may be arranged to determine the forces in a selected section of the boom or the stay structure interconnected between the boom and the loader platform. More particularly, in the preferred embodiment, the electric crowd and hoist motors are monitored to measure the torques seen by the motors.

Figure 3:
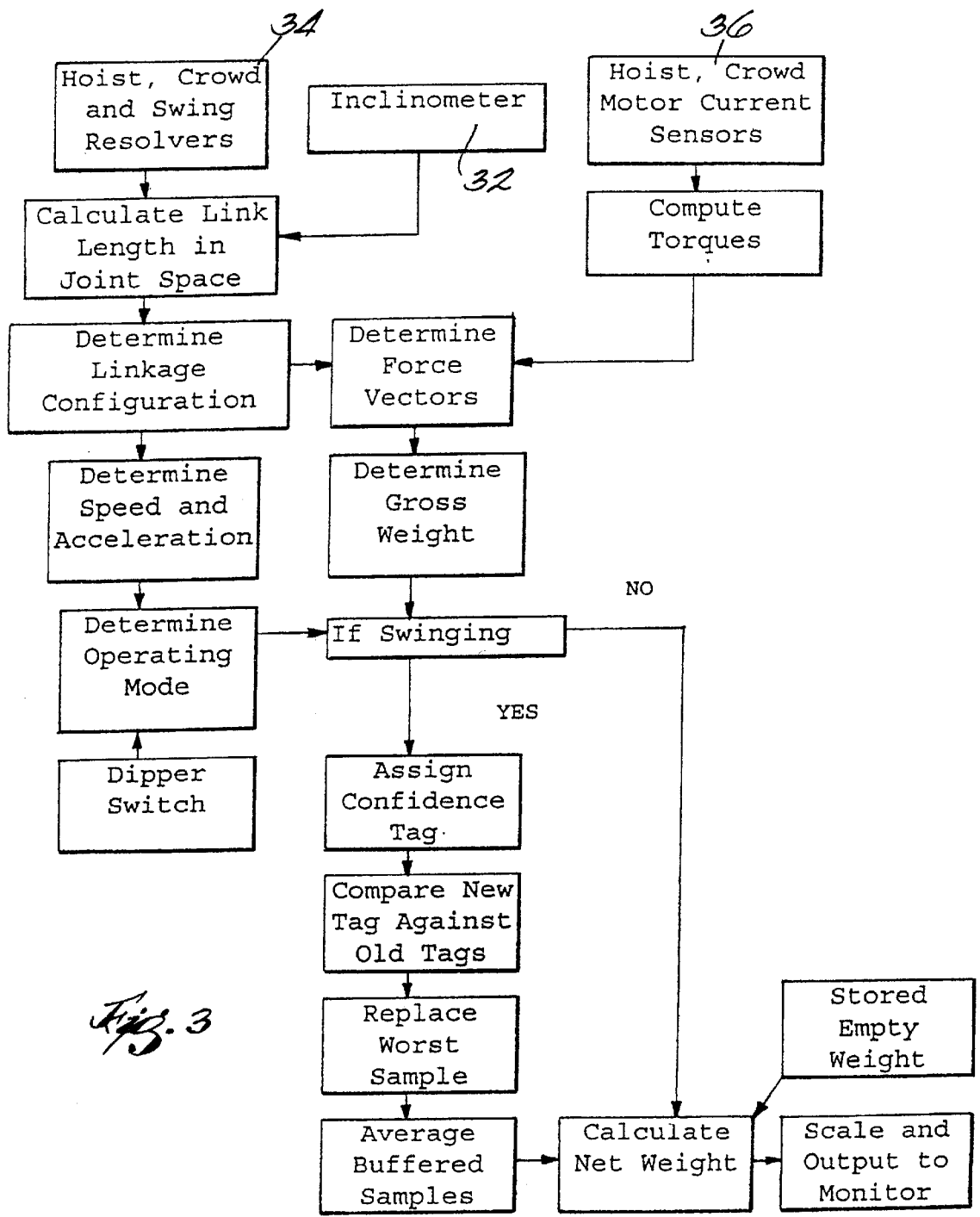
FIG. 3 is a function block diagram of the load measurement system of FIG. 1.

Referring to FIG. 3, current sensors 36 of well known design are used to detect the electrical operating parameters of the hoist and crowd motors. On the hoist motor the armature current and field current are sensed. Similarly, the crowd motor is sensed for armature current and field current. Further, where the hoist and crowd motor field currents are known, the field current sensors can be omitted.

A scalar function generator is used to determine a torque constant for each of the hoist motor and crowd motor. It is well known in the art that constants can be determined based on the armature currents by using graphical methods on design curves published for a given motor for a given field current.

The torque of each motor is scaled to units of a linear force using the known gear ratios and moment arms of the respective hoist and crowd drive mechanisms. Different scaling factors are used for the crowd arm and hoist rope torque to force conversion.

In order to compute the gross dipper weight, the forces and direction of the forces acting on the dipper must be determined. In order to do this, the position of the boom, the crowd arm, and the position of the hoist rope must be known, as well as the location of the dipper itself. Further, because the hoist rope is trained over a sheave and depends on the location of the shovel arm, the point of departure of the hoist rope from the sheave can vary. It is important to determine where on the sheave the hoist rope is positioned. This is done as described in the following manner. Once the exact position of the bail pin 30 is determined, then the apparent gross dipper weight is accurately computed.

Figure 8:
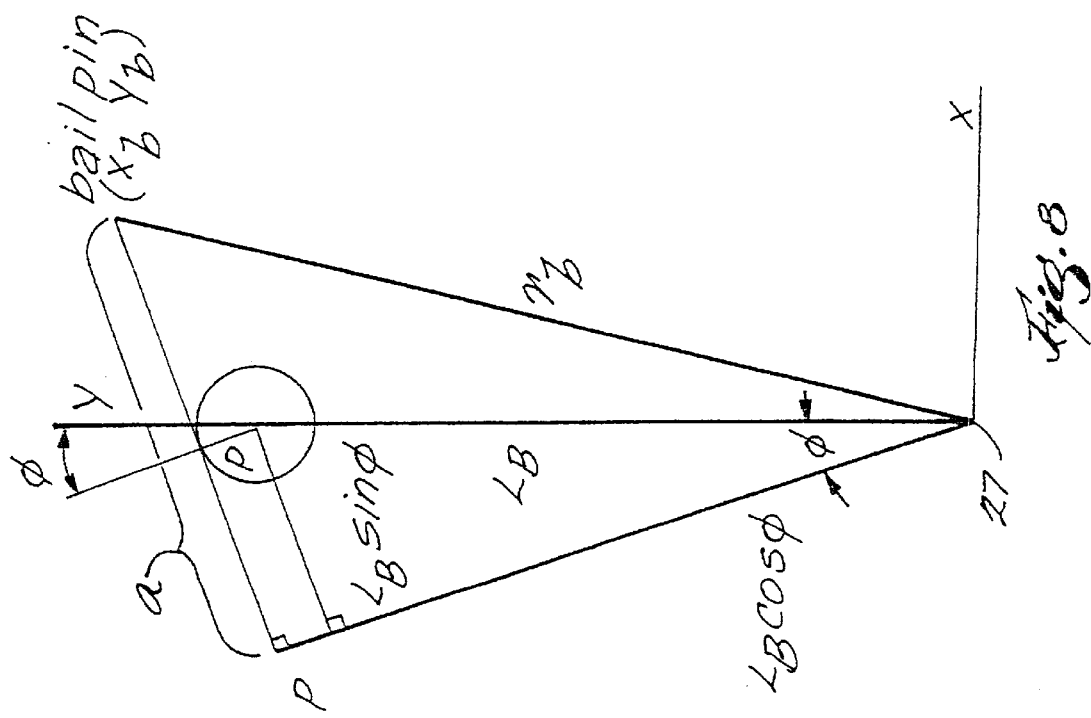
FIGS. 7 and 8 are simplified drawings showing the general layout of the shovel boom and crowd arm in the three basic positions relevant to determining the angle at which the hoist rope leaves the sheave on the end of the boom.
Figure 7:
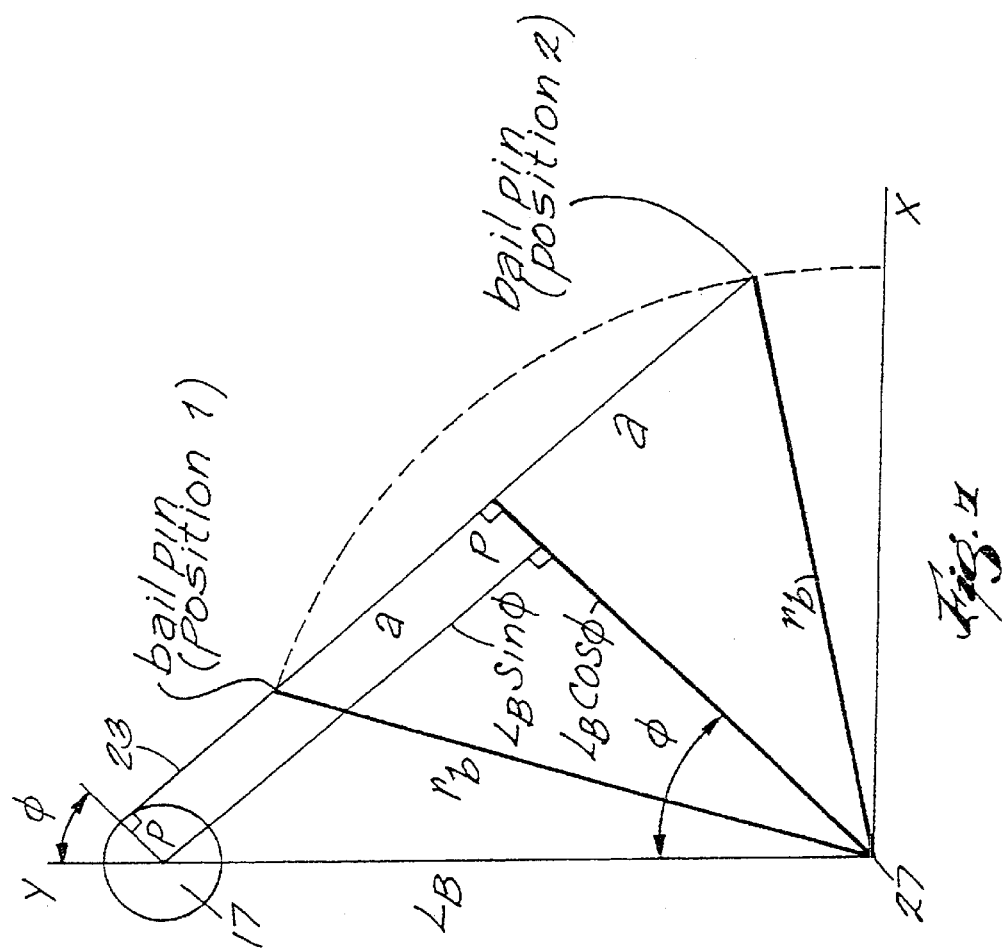

The dipper relative to the boom 15 assumes one of three possible positions. Positions 1 and 2 are illustrated in FIG. 7, position 3 is illustrated in FIG. 8. Doing a geometrical analysis of the various positions yields the following results. Once these calculations yield the location of the bail pin 30, the center of gravity of the dipper is calculated from the dipper's known construction.

In the equations, P is the radius of the sheave at the top of the boom, $L_B$ is the length of the boom from the saddle block pivot point 27 to the bail pin 30, $r_b$ is the distance along the crowd arm from the saddle block pivot point 27 to the bail pin 30, $l_h$ is the length of the hoist rope from the top of the boom sheave to the bail pin, and $\phi$ is the angle between the longitudinal axis of the boom 15 and where the hoist rope 23 leaves the sheave 17. The bail pin is in position 1 if $l_h < l_{h0}$, in position 2 if $l_h > l_{h0}$, and in position 3 if $r_b > L_B + P$, and $l^{h0} = P \cos^{-}Z + L_B \sqrt{1-Z^2}$, with $Z = (r_b - P)/L_B$. Once the bail pin 30 position is known, $\phi$, expressed in radians, is found in an iterative manner using the following equations.

$$a = \sqrt{r_b^2 - (L_B \cos\phi + P)^2},$$

and $P\phi + L_B \sin \phi - a - l_h = 0$ for position 1 and $P\phi + L_B \sin \phi + a - l_h = 0$ for position 2 and 3

The location of the bail pin 30 in space, before being adjusted by the inclinometer readings, in the plane of the boom can then be found by the following two equations.

$x_b P \sin \phi + (l_h - P\phi) \cos \phi$ $y_b L_B + P \cos \phi - (l_h - P\phi) \sin \phi$ Then, to take the inclinometer readings into account, the difference u between the vertical axis of the shovel and true vertical is used to find new x and y coordinates, where $x = x_b \cos u - y_b \sin u$ and $y = x_b \sin u + y_b \cos u$. The $z_b$ position of the boom is found from the swing resolver.

A calibration procedure is performed at the beginning of operation of the load measurement system. The crowd arm 21 is extended until the hoist rope is vertical, and raised until it is horizontal. These orientations are checked with suitable equipment. From this calibrated position, the crowd arm length and the hoist rope length are initialized to their respective known dimensions as determined from the shovel mechanical drawings. Recalibration is needed when any of the wire ropes on the shovel are replaced, or when other shovel conditions change.

The load measurement system also includes processing means to receive the position and load signals for a plurality of interval determinations and calculate therefrom a number of weight determinations of the dipper and dipper contents from the interval determinations made during movement of the dipper, to select a sample of less than all of the weight determinations based upon the dynamic influences on the machine when the signals are processed, and to average the sample of selected weight determinations to provide a final weight determination of the dipper and dipper contents. More particularly, two processors are used, one processor 44 for performing the above calculations, and a second processor 48 for controlling the data bus, input and output ports and monitor and serial communications, as illustrated schematically in FIG. 9. In other embodiments, one processor can be used.

By suitably programming the processor and providing signals thereto regarding the position of the dipper, and the forces in a selected part of the structure, the processor can determine the weight of the dipper plus contents if any, by using a simplified force analysis. More particularly, a force diagram is constructed using the hoist pulling force, the crowd torque, the handle weight, and the gross dipper weight. By summing the moments of all of these forces about the center of the crowd drive pinion, the unknown gross dipper weight can be found. It will be appreciated that the program will depend, in part, on the construction of the shovel loader and the location of the forces measurement. However, the development of the particular mathematical formula and a program based thereon is within the skill of competent engineers.

The processor, using the same weight program during the calibration procedure, also computes the hardware weight of the shovel hardware acting on the dipper 22 so that it can be later subtracted from the total weight to arrive at the net weight of the material in the dipper 22. Since the net dipper weight is measured in the calibration procedure at a dipper position which closely approximates the dumping position of the dipper, there is no need to adjust the net dipper weight for changes in the length of the crowd arm or the hoist rope length.

The movement of the dipper in space together with the monitoring of the dipper weight contents is also used to determine the operating mode of the dipper. As illustrated in FIG. 3, the first or Tuck mode is when the empty dipper is lowered and is at the position where it is about to begin to engage the bank and gather material. The shovel then begins to raise and gather material. When it reaches a point where it breaks out of the bank of material, it enters the second or Break Out of Bank mode. The dipper then continues to raise and then starts to swing, thus entering the third or Swing mode. After swinging over to where it is located above the truck which will receive the material, a dipper trip occurs which opens the bottom of the dipper allowing the material contents to fall into the truck. This is the fourth or Dipper Trip mode. The dipper is then lowered back to its tucked position and the dipper door closes and the cycle repeats itself.

The accuracy of the determination of the weight of the load is increased if the determination of weight of the loaded dipper uses values taken while the dipper is in a steady state. At other times substantial kinetic loads are experienced and these loads may fluctuate significantly within those periods. These kinetic loads adversely affect the weight determinations computed by the load measurement system. Accordingly, the load weighing system of this invention excludes from the load weighing process a number of the weights calculated at when the dipper is in other than a steady state.

An example of such dynamic forces encountered during the movement of the dipper from the loading to the dumping position is the centrifugal force acting on the dipper, boom and other components having rotary motion. Further, friction, rapid starting and stopping, and bouncing of the dipper also affect the accuracy of the weight calculations. These types of dynamic forces are frequently encountered while swinging the dipper from the bank to the location of the truck where the material is to be dumped.

The load weighing system of this invention selects a sample of only steady state weight determinations in the following manner. The processor memory includes a buffer which keeps a plurality of weight determinations which are averaged to compute a dipper gross weight. When swing first occurs, the buffer contents are empty and new averaging begins. At the time the dipper trip occurs, the best values observed, which in the preferred embodiment would be the best one-hundred values which with the highest confidence values, as explained below, are used to calculate an average net weight. This average net weight at the dipper trip is then the value retained by the load weighing system as the actual material weight. This value has been found experimentally to be within two percent of the actual weight of the contents of the dipper.

It is during the swing to truck mode that the net weight of material in the dipper 22 is calculated because it is then that the load is fully suspended from the shovel and away from the bank (not shown). At the time of dipper trip, the net weight of the contents of the dipper 22 is also added to a running total of weight already dumped into the truck, and the buffer contents are emptied. The running total of the material weight in the truck is displayed to the operator and is reset to zero when the operator dispatches the truck.

The load weighing system transmits its output or its measure of dipper content weight to a monitor in the operator's cab. Although the only weight which must be accurate is the dipper weight of the contents which fall into the truck, it is desirable to have the operator see the material weight and the weight change as the dipper gathers material. For this purpose, a weight value is transmitted to a monitor in the operator's cab as the dipper is filled.

Depending on whether the dipper is still in the bank, or has broken out of the bank, or has started to swing, a different scaled weight value of the various weight values gathered in the buffer is transmitted to the monitor. After the tucked position, and prior to breaking out of the bank, the weight values received are scaled upwardly with distance at an exponential rate up to about 0.75 as the dipper is raised. After breaking out of the bank, and prior to swinging, a second scaled up value varying overtime with time from 0.75 to 0.9 is used. After starting to swing, the actual average value of the net weights stored in the buffer (a scale of 1) is transmitted to the operator, and then the best of these various weight values is used to compute the actual weight at the time of dipper trip. At all times, the average of the one hundred values in the buffer is what's used to output a net weight. At the time the dipper starts to swing to the truck, as well as at the start or any other of the operating modes, the buffer is emptied and new values with new confidence tags are assigned. The resultant weight of material delivered each cycle as calculated by the main processor is also transmitted to a remote base computer.

In order to determine which of the four modes of operation the shovel is in, the crowd and hoist position is monitored. When assuming the tucked position before beginning to gather material, the dipper is pulled inwardly, resulting in one direction of movement of the crowd and hoist position. Next, the crowd arm and hoist will re-extend the dipper into the bank, thus reversing the hoist and crowd positions. By monitoring the crowd and hoist positions, and looking for this change in direction, the load weight system determines the start of material gathering, the Tuck mode. The change in hoist and crowd positions is then further monitored to where a predetermined position is assumed. This is where Breaking Out of Bank mode is expected to have occurred. In other embodiments, Breaking Out of Bank can be determined by looking at where the hoist motor current reaches its peak. The Swing mode occurs when the swing resolver detects swing movement.

Once the position of the dipper is known, changes in position over time are used to compute the velocity and acceleration of the boom. This information is then used to select the best sample of weight determinations, as more particularly described below. Initially, the hoist and crowd positions are monitored to determine the dipper's location in space. At the next timed interval, a new dipper position is determined. Further, the velocity of the dipper is computed by comparing the distance traveled by the dipper over the given time. With the next sample, a new dipper position is determined, a new velocity of the dipper is computed and the dipper acceleration is found by computing the change in the velocity from the prior data sample to the new data sample. With the fourth sample, a new dipper location is found, a new velocity is determined, the change in velocity is found and a new acceleration is determined. Then, with each additional sample, further changes in velocity and in acceleration are monitored. With each new dipper location, the hoist and crowd motor currents are also monitored and then used to compute, as described above, the forces being exerted on the hoist rope and the crowd arm by the dipper contents. Using these forces, together with the geometry of the boom, hoist rope and arm, the gross dipper weight is computed. This gross weight is then assigned a confidence factor between zero and one; zero meaning a very low confidence and one meaning a high confidence. The confidence value is determined based upon the observed velocity and the observed acceleration. The higher the velocity or acceleration, the lower the confidence value, the closer the velocity and acceleration are to zero, the higher the confidence level.

Various methods of assigning a confidence tag can be used, including empirical methods where only the weight measurement values associated with a velocity of less than some value and acceleration of less than some value are used. In the preferred embodiment, however, fuzzy logic techniques are used.

The fuzzy logic approach used in the preferred embodiment has a rule evaluation procedure where rules are created, antecedent truth values are found, rule strengths are determined and the fuzzy output is evaluated for each consequent label, as is conventionally done in fuzzy logic controls. More particularly, during the fuzzification process, the velocity and acceleration input values are put into the appropriate membership functions to determine a resultant truth value for each label. The result is then the fuzzy input.

In the next step, a calculation is made of the truth value of each rule using a min-max inference, this result being equal to the minimum of the truth value of the fuzzy inputs for each rule. The fuzzy outputs are then calculated by determining the maximum rule strength for each output label. Taking the maximum rule strength for each of the output labels, reference is then made the output label membership functions, where a center of gravity approach to defuzzification is used to find the confidence tag.

Figure 4:
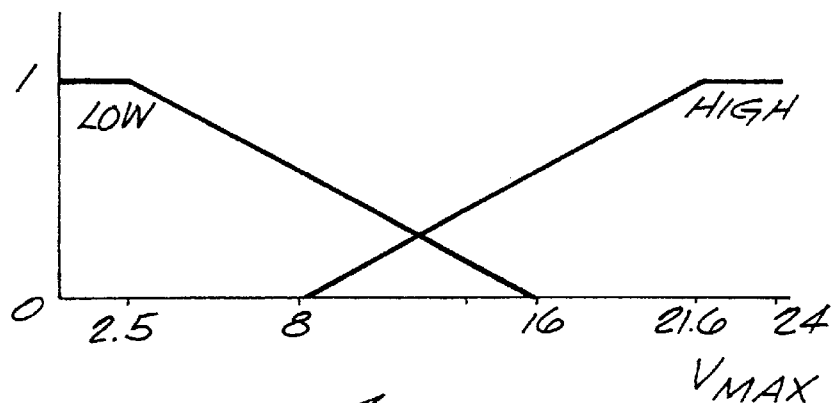
FIGS. 4, 5 and 6 are graphs of fuzzy logic membership functions for dipper velocity, dipper acceleration, and weight value confidence, respectively, used in assigning confidence tags to each weight determination.
Figure 5:
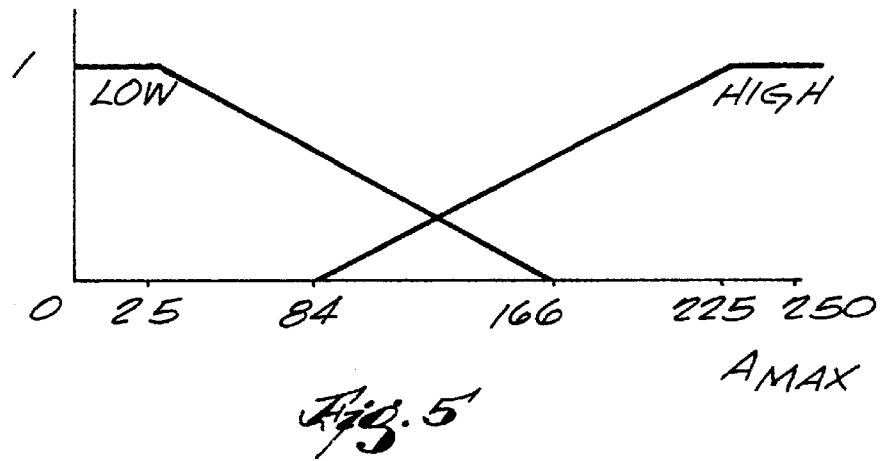
Figure 6:
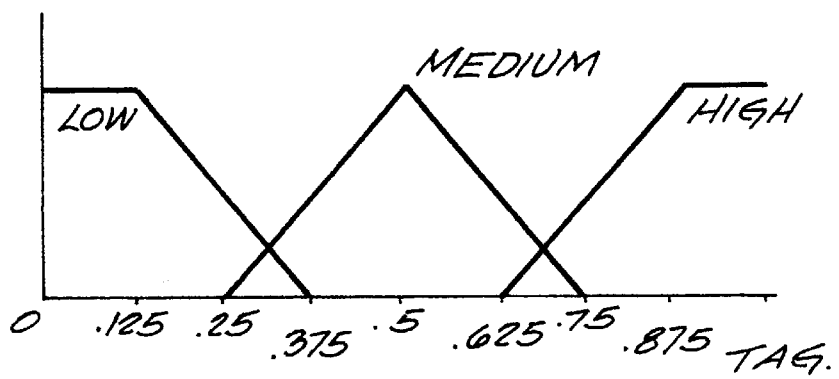

More particularly, one example of such a computation is found by referring to FIGS. 4 through 6. First, the velocity and acceleration inputs are assigned a degree of truth, depending on whether they fall within a membership function of low or a membership function of high. Although the particular membership functions and values can vary with different approaches and for different machines, in this example, the observed velocity up to a maximum velocity is plotted on the X axis and a value between zero and one is plotted on the Y axis. Every value of velocity is assigned a label of low and a label of high. The degree of truth of each of these labels is determined by reference to FIG. 4. For acceleration, every value is also assigned a label of low and a label of high. The degree of truth of these labels is determined from FIG. 5. In other embodiments, other membership function shapes or values can be used.

The appropriate output label (confidence factor) and its degree of truth are then determined using the following rules. If the velocity is low and the acceleration is low, then the confidence factor is high. If velocity is high and acceleration is high, then the confidence factor is low. If the velocity is low and the acceleration is high, then the confidence factor is medium. If the velocity is high and acceleration is low, then the confidence factor is medium. Each of the rules is then evaluated, using the degrees of truth found from FIGS. 4 and 5.

As an example, assume the velocity is ten feet per second and the acceleration is sixty feet per second squared. This for velocity would produce a truth value of 0.44 for low and 0.15 for high. Looking at acceleration, the truth value for low would be 0.75 and the truth value for high would be zero. Turning to each of the rules then, if velocity is low (0.44) and acceleration is low (0.75), then the confidence factor is high has a rule strength of 0.44, the minimum of the two values. For the rule if velocity is high (0.15), and acceleration is high (zero), the confidence factor is low would have a rule strength of zero. If velocity is low (0.44) and acceleration is high (zero), then the confidence factor is medium would have a rule strength of zero. And, lastly, if velocity is high (0.15) and acceleration is low (0.75), then the confidence factor is medium, would have a rule strength of 0.15. Turning to the confidence tag FIG. 6, and looking at low having a maximum rule strength of zero, medium having a maximum rule strength of 0.44 and high having a maximum rule strength of 0.15, the center of gravity of the graph of each membership function under these values produces a center of gravity at about 0.73. This 0.73 value then would be the confidence tag assigned to this gross weight calculation.

The various inputs described above are monitored at timed intervals. The timed interval or sampling rate in the preferred embodiment is about 3,600 samples per second. Of some 10,000 (minimum) measurements of gross weight taken during a typical dipper swing cycle, about 200 values have been found to have a confidence factor of greater than 0.75. Of these, in the preferred embodiment, the best 100 are used in calculating the actual net weight of the material being carried by the dipper.

While in the foregoing description a swing motor and mode detect system has been described in combination with determinations of the hoist and crowd motor currents, this is not essential as accurate load determinations can be made in other embodiments with other load sensors. The load measurement system of this invention is also operable where some of the previously described determinations are not employed. For example, instead of deriving speed and position information from resolvers and/or tachometers, motor operating parameters could be used. Similarly, hoist rope and crowd angles could be measured directly with angular position sensors. However, these approaches require additional hardware not needed in the foregoing preferred embodiment.

Various other features of the invention are set forth in the following claims.

What is claimed is:

1. A method of measuring the quantity of material delivered per cycle by large mining and hoisting machinery, the machinery having a device to hold the material to be delivered, the device being movable between loaded and unloading positions, said device being supported from a structure during movement between said positions, said method comprising determining the position of the device in respect to a selected location on said structure in the form of a processable position signal at a plurality of intervals during the movement of the device between said loaded and unloading positions, determining the load at a selected location within said structure where the load is related to the weight and position of the device and device contents in the form of a processable load signal at each said interval, processing said position and load signals for a plurality of interval determinations to provide a number of weight determinations of the device and device contents from the interval determinations made during said movement, selecting a sample of less than all of said weight determinations based upon the dynamic influences on the machinery when the signals are processed, some of the samples being excluded being those obtained at other than at the beginning and end of the movement of the device, and averaging said selected sample of weight determinations to provide a final determination of the weight of the device and device contents.

2. A hoisting machine including a device supported from a structure, the device holding the material to be lifted, the structure being movable to locate the device in respective loaded and unloading positions, and apparatus for measuring the quantity of material delivered by the device, said apparatus comprising means to determine the position of the device with respect to a selected location in the structure at a plurality of intervals during said movement of the device, means to provide a processable position signal indicative of the determined position of the device, means to determine the load at a selected location within the structure where the load is related to the weight of the device and device contents at said intervals during said movement of the device, means to produce a processable load signal indicative of the determined load at said location, and processing means to receive said position and load signals for a plurality of interval determinations and calculate therefrom a number of weight determinations of the device and device contents from the interval determinations made during said movement, to select a sample of less than all of said weight determinations based upon the dynamic influences on the machine when the signals are processed, some of the samples being excluded being those obtained at other than at the beginning and end of the movement of the device, and to average said sample of selected weight determinations to provide a final weight determination of the device and device contents.

3. The machine as claimed in claim 2 wherein the structure includes a platform, and an upwardly extending boom connected at the lower end to the platform, and wherein said device is suspended from said boom.

4. The machine as claimed in claim 3 wherein said means to determine the position of the device with respect to a selected location in the structure at a plurality of intervals during said movement of the device includes means for determining the angle of the boom relative to the direction of the force of gravity.

5. The machine as claimed in claim 4 wherein said boom angle determining means is an inclinometer.

6. The machine as claimed in claim 3 wherein said structure further includes a sheave at the top of the boom, and a hoist rope trained over the sheave and attached to the device to suspend the device from said boom, and wherein said means to determine the position of the device with respect to a selected location in the structure at a plurality of intervals during said movement of the device considers the sheave diameter and the angle the hoist rope leaves the sheave.

7. The machine as claimed in claim 2 wherein said processing means to select a sample of less than all of said weight determinations based upon the dynamic influences on the machine when the signals are processed uses device velocity and device acceleration in selecting weight determinations.

8. The machine as claimed in claim 2 wherein said processing means to select a sample of less than all of said weight determinations based upon the dynamic influences on the machine when the signals are processed selects weight determinations where the device velocity and device acceleration are closest to zero.

* * * * *